(No Model.)
D. B. JACKSON, D. E. CHANDLER & J. C. WILLIAMS.
TWO WHEELED VEHICLES.
No. 244,610. Patented July 19, 1881.
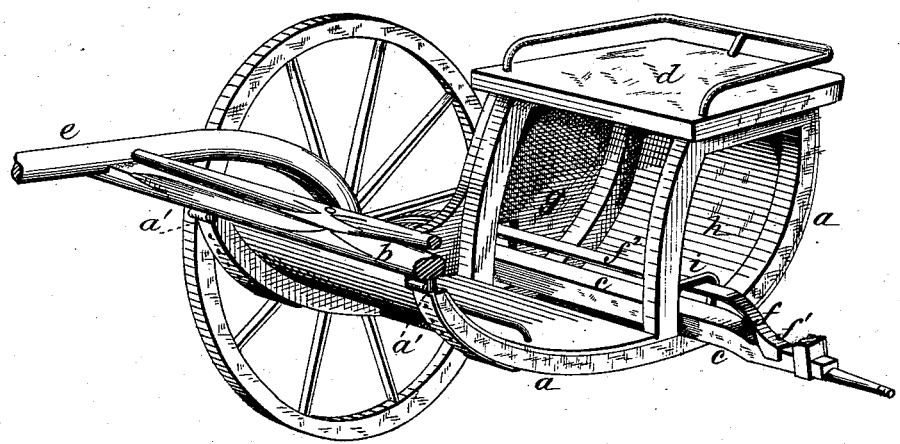
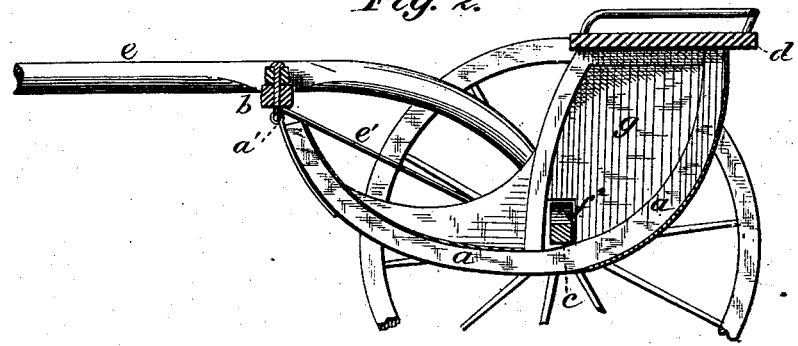
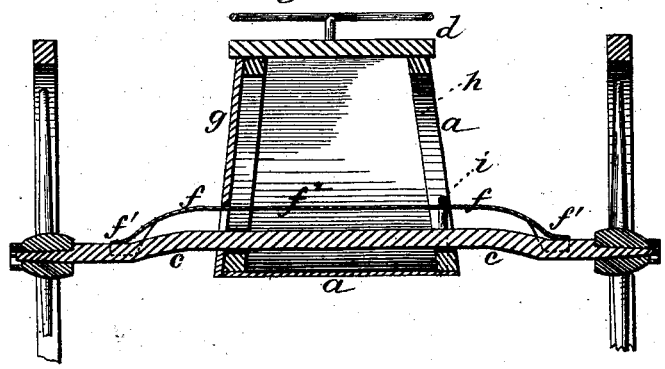
Witnesses:
W. N. H. Knight
Floyd Norris
Inventors:
D. B. Jackson,
D. E. Chandler,
J. C. Williams.
by Johnson and Johnson
Attys

UNITED STATES PATENT OFFICE.

DEMONT B. JACKSON, DAVID E. CHANDLER, AND JAY C. WILLIAMS, OF AURORA, ILLINOIS, ASSIGNORS OF ONE-HALF TO SAID JACKSON, ONE-FOURTH TO SAID CHANDLER, AND ONE-FOURTH TO SAID WILLIAMS.

TWO-WHEELED VEHICLE.

SPECIFICATION forming part of Letters Patent No. 244,610, dated July 19, 1881.

Application filed Decembeer 20, 1880. (No model.)

*To all whom it may concern:*

Be it known that we, DEMONT BAKER JACKSON, DAVID EMERY CHANDLER, and JAY CADY WILLIAMS, citizens of the United States, residing at Aurora, in the county of Kane and State of Illinois, have invented new and useful Improvements in Two-Wheeled Vehicles, of which the following is a specification.

Our invention relates to improvements in two-wheeled vehicles; and the objects of our improvements are to produce a light, safe, and easy-going vehicle, to afford equal facility for the driver to mount and to dismount at the rear as at the front, and to produce a durable track-sulky, in which both the axle and the seat-supporting spring pass through the seat-supporting body, which is supported at both sides upon a spring or springs in the line of the axle, in connection with a seat-supporting body hinged to the cross-bar of the shafts or to the shafts and extending back and beneath the axle.

Referring to the accompanying drawings, Figure 1 represents a view, in perspective, of a two-wheeled vehicle embracing our invention; Fig. 2, a vertical longitudinal section, and Fig. 3 a cross-section through the axle.

The seat-body $a$ is hinged to the cross-bar $b$ of the shafts or to the shafts, and extends back of and beneath the axle $c$, rising in the rear thereof, and provided with the seat $d$, which is suitably supported by arms or the sides of the body. The seat-body is hinged at its front corners, $a'$, to the cross-bar $b$; but it may be hinged to the shafts. The seat-body is preferably of the curved form shown; but it may be of any suitable form and construction. The shafts $e$ are rigidly secured to the axle and braced by braces $e'$, and the seat-body is hung low down between the shafts. The axle $c$ passes through the seat-body, and the spring $f$ also passes through the body above the axle, and rests thereon at its ends $f'$ $f'$, at or near the shaft ends. The body is supported at both sides upon this spring, and is provided with side openings which allow of its vertical movement with the spring over and beneath the axle. The spring shown has a flat middle part, $f^2$, and curved bearing ends $f'$, and the seat-body rests upon this flat part between the bearing ends. It cannot be displaced from the axle, and should it become broken the seat-body will settle down and be held upon the axle. The body can have no side movement upon the spring, for the front hinges serve to brace it against side movement.

Any suitable form of spring may be used, and any number of springs, and, if deemed necessary, the spring or springs may be secured to the body, to the axle, to the shafts, or to a brace of the shafts, or to swinging links of the axle.

In the normal position of the body it rests, by the force of the spring, against the under side of the axle, which also serves to prevent too great rebound of the body in passing over ruts or otherwise. When the sides of the body are closed, as at $g$, they form the supports upon the spring; but when these sides are open, as at $h$, then loops or angle-irons $i$, secured to the bottom of the body, form the supports therefor upon the springs. The seat-body thus mounted maintains a low-down position in relation to the axle, so that the driver can mount and dismount as easily from the rear as from the front. No accident can occur from the breaking of the spring, for in such event the body will sink upon the axle and be supported and secured in position by it.

The spring shown is a single one and passes through the body; but it may be divided into two springs secured to and projecting from the body and resting upon the axle at or near the connected ends of the shafts. To hold the bearing ends $f'$ of the spring or springs upon the axle they are provided with turned-down lips, which embrace the axle and slide over and upon it with the bearing ends. A convenient way of securing the spring to the body is by a bar passing through the body and secured to it and to the spring. The spring may be supported in front or in rear of the axle by arms projecting therefrom.

A two-wheeled vehicle with the axle passing through the body, which is provided with vertical side slots to allow of its free vertical movements upon springs placed beneath the axle on each side of the body, and upon which the body is suspended, instead of being supported to obtain a low-down seat, is not new. A sulky having a seat-supporting frame hinged at the front to the cross-bar of the shafts is also old; but in such case the axle does not pass through the seat-supporting body, nor does such construction afford the advantages of a low-down seat.

By my improvement I obtain the advantage of a hinged seat-supporting body, through which both the axle and the spring passes to give a low-down seat-frame supported upon a spring beneath said seat.

We claim—

1. In a two-wheeled vehicle or sulky, the combination of a seat-body, hinged at its front and extending beneath the axle, with the axle and a spring or springs passing into or through the seat-body and supporting it, substantially as described, for the purpose specified.

2. In a two-wheeled vehicle or sulky, the supporting spring or springs for the seat-body, passing into or through the latter above the axle, supporting the body at each side, and having bearing ends outside of said body, combined with an axle, also passing through said body and forming a stop to prevent the undue rebound of said body, substantially as described, for the purpose specified.

3. In a two-wheeled vehicle, the supporting spring or springs for the hinged seat-body, arranged to pass through or into said body, substantially as described, for the purpose specified.

4. The spring arranged to support a low-down seat-body, and having its ends bearing and sliding freely upon the axle, substantially as described.

5. The combination, in a sulky, of a hinged low-down seat-supporting body, an axle passing through said body, and a spring having a flat part, $f^2$, passing through or into said body, and curved ends $f'$, having a free bearing upon the axle outside of said body, and provided with means for holding said bearing ends upon said axle, substantially as described.

In testimony whereof we have hereunto set our hands in the presence of two subscribing witnesses.

D. B. JACKSON.
D. E. CHANDLER.
JAY CADY WILLIAMS.

Witnesses:
JAMES SHAW,
PIERCE BURTON.